J. H. REID.
ELECTRIC SMELTING AND REFINING APPARATUS.
APPLICATION FILED AUG. 18, 1910.
993,105.
Patented May 23, 1911.
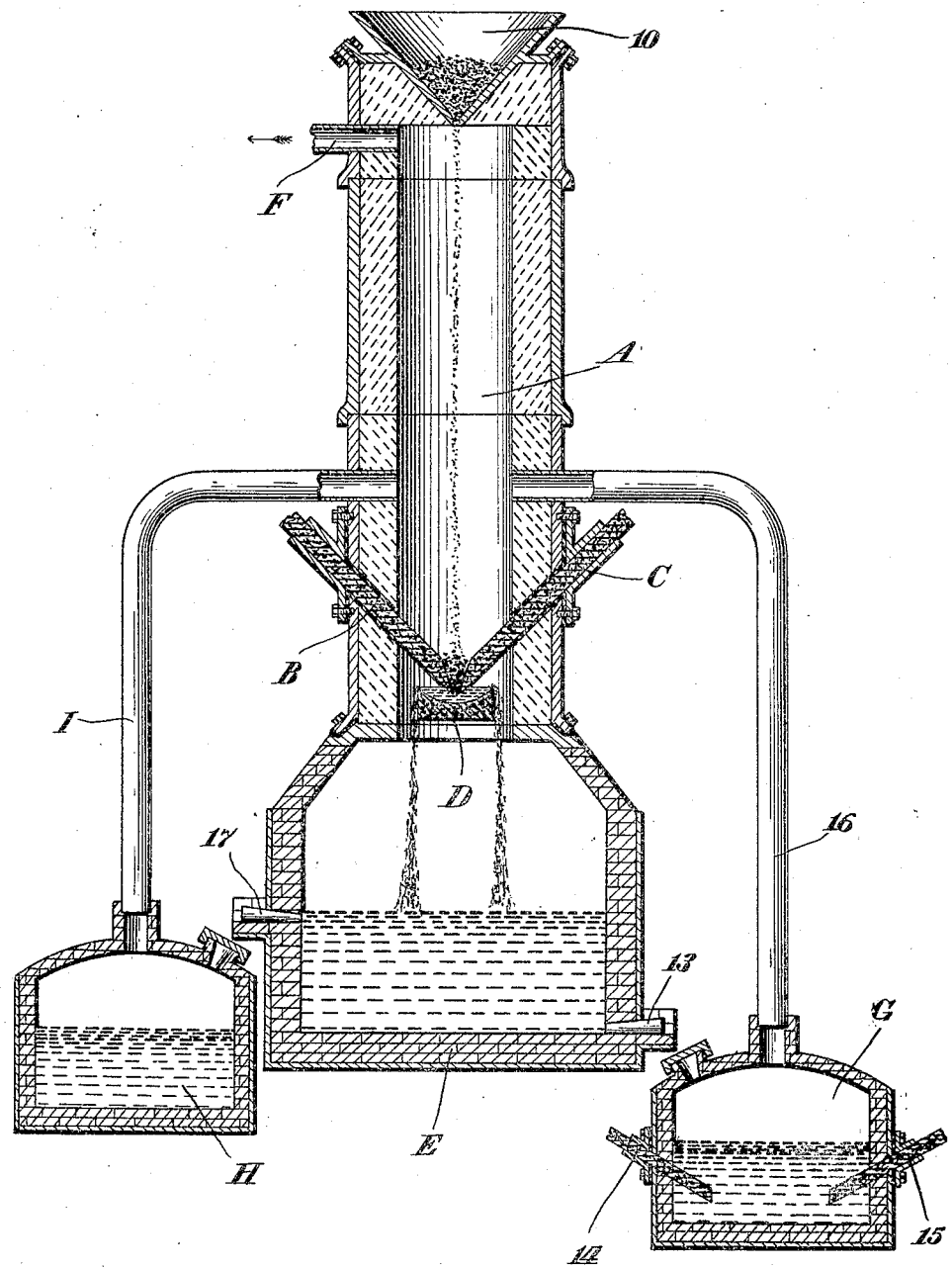
WITNESSES,
INVENTOR,
J. H. REID.
BY
ATT'Y.

UNITED STATES PATENT OFFICE.

JAMES HENRY REID, OF NEWARK, NEW JERSEY, ASSIGNOR TO GEORGE GOODWIN, OF OTTAWA, CANADA.

ELECTRIC SMELTING AND REFINING APPARATUS.

993,105.  Specification of Letters Patent.  Patented May 23, 1911.

Application filed August 18, 1910. Serial No. 577,884.

*To all whom it may concern:*

Be it known that I, JAMES HENRY REID, of Newark, in the State of New Jersey, United States of America, have invented certain new and useful Improvements in Electric Smelting and Refining Apparatus, of which the following is a specification.

My invention relates to improvements in electric smelting and refining apparatus of the type in which the material to be treated is submitted to the action of the electric arc, and the objects of my invention are to present the material to the arc in a better state for treatment, which objects are accomplished by causing the hot gases rising from the treated material to pass around and through the material which is passing into the electric arc, all as hereinafter more fully set forth and described in the accompanying specifications and drawings.

The drawing shows a vertical section through the apparatus embodying the present invention.

Referring to the drawings, A represents a treating chamber more or less in the form of a stack having electrodes B, C and D at the lower end producing arcs through which the material treated is adapted to pass, the arrangement of the electrodes being similar to that described in my earlier United States Patent No. 947,849, granted Feb. 1, 1910. The fixed electrode D, however, is concaved on the upper surface, whereby a small pool of molten material will collect therein, the treated material passing over the outer edges of said electrode.

The top of the chamber A has a feed hopper 10 in which the ore or other material to be treated in a finely divided state is placed, said ore dropping through the bottom of the hopper in a continuous stream into the arcs produced by the electrodes B, C and D.

The bottom of the chamber A communicates with a collecting chamber E in which the molten material passing over the electrode D is adapted to pass. It will be noticed that the hot gases rising from this molten mass will pass up and around the ore passing to the arcs and will finally pass out through a suitable outlet F provided at the top, suitable exhausting means being preferably connected to said outlet.

The refined metal is adapted to be tapped out of the collecting tank through a tap hole 13, and passes into a treating chamber G in which it may be further refined as by heating with suitable electrodes 14 and 15.

The hot gases rising from the metal in the chamber G are caused to pass about the falling stream of ore; this being effected by providing a conduit 16 leading from the top of the chamber G and opening above the electrodes in the chamber A, said hot gases passing upwardly and out through the exhaust conduit F.

The slag is adapted to be tapped out from the chamber E through a suitable tap hole 17 and adapted to pass into a slag pit H and the hot gases from the slag is also caused to pass about the falling stream of ore, this being effected by providing a conduit I extending into the top of the chamber H and opening above the electrodes in the chamber A, the hot gases passing through the same being adapted to intimately mingle with and heat the falling stream of finely divided ore and then pass out through the conduit F. In this way, the finely divided ore is thoroughly heated before it reaches the electrodes and consequently it will not require so much power to reduce it.

The nature of the gases rising from the material in the different chambers will necessarily depend on the character of the ore. Where the ore has been reduced, a carbon dioxid gas will be present and will gradually rise from the molten mass.

As many changes could be made in the above construction, and many apparently widely different embodiments of my invention within the scope could be made without departing from the spirit or scope thereof, it is intended that all matter contained in the accompanying specifications and drawings shall be interpreted as illustrative and not in a limiting sense.

What I claim as my invention is:

1. In an electric furnace, a treating chamber, electrodes extending through the wall thereof and meeting at substantially the center adapted to form a temporary retaining means for the ore during treatment, means for dropping the ore in a finely divided state into the electrodes, a collecting chamber separated from the treating chamber and adapted to receive the material after it has passed through the arc, and means for passing the hot gases rising from the material in the collecting chamber about the finely divided material before it passes into the arc.

2. In an electric furnace, means for creating an arc and dropping the ore in a finely divided state into the same, a collecting chamber to receive the material treated after it has passed through the arc, a slag pit, means for tapping off the slag from the first chamber into the slag pit and means for passing the hot gases rising from the slag about the material before it is introduced into the arc.

3. In an electric furnace a treating chamber having a collecting chamber at the bottom, means for creating an electric arc in the treating chamber through which the material is adapted to pass, a refining chamber into which the material from the collecting chamber is adapted to be tapped, a slag pit into which the slag is adapted to pass, and means for conducting the hot gases from both the slag pit and collecting chamber and passing them about the material before it is introduced into the arc.

4. In an electric furnace a treating chamber having a collecting chamber at the bottom, means for creating an electric arc in the treating chamber through which the material is adapted to pass, a refining chamber into which the material from the collecting chamber is adapted to be tapped, a slag pit into which the slag is adapted to pass, and conduits leading from the slag pit and refining chamber and opening above the arc in the treating chamber.

5. In an electric furnace, a fixed electrode recessed on the upper side to form a basin, and oppositely disposed electrodes entering said basin and adapted with the fixed electrode to form a hopper to receive the ore.

In witness whereof I have hereunto set my hand in the presence of two witnesses.

JAMES HENRY REID.

Witnesses:
 RUSSEL B. SMART,
 WM. A. WYMAN.